United States Patent [19]

del Rio et al.

[11] 4,104,258
[45] Aug. 1, 1978

[54] METAL COMPLEX COMPOUNDS OF POLYACYL-2,4-DIHYDRAZINO-5-TRIAZINES

[75] Inventors: Marija del Rio, Obernburg am Main; Joachim Behnke, Miltenberg; Michael Wallrabenstein, Worth am Main; Dieter Frank, Elsenfeld, all Germany

[73] Assignee: Akzona Incorporated, Asheville, N.C.

[21] Appl. No.: 471,505

[22] Filed: May 20, 1974

[30] Foreign Application Priority Data

May 24, 1973 [DE] Fed. Rep. of Germany ....... 2326472

[51] Int. Cl.$^2$ .............................................. C08G 73/08
[52] U.S. Cl. .................................................... 528/334
[58] Field of Search ........... 260/47 R, 47 CZ, 47 CP, 260/78 R, 78 TF

[56] References Cited

U.S. PATENT DOCUMENTS

| | | | |
|---|---|---|---|
| 2,512,631 | 6/1950 | Fisher et al. | 260/2 |
| 3,130,182 | 4/1964 | Frazer | 260/78 |
| 3,642,720 | 2/1972 | Kray et al. | 260/78.4 |
| 3,666,723 | 5/1972 | Kray et al. | 260/47 |
| 3,787,348 | 1/1974 | Dobinson et al. | 260/32.6 |
| 3,803,075 | 4/1974 | Kray et al. | 260/30.2 |

*Primary Examiner*—Lester L. Lee
*Attorney, Agent, or Firm*—Keil, Thompson & Shurtleff

[57] ABSTRACT

A metal compound of a polyacyl-2,4-dihydrazino-s-triazine in which the metal is chemically bound in complex form to the polymer to provide dimensionally stable and heat-resistant polymeric compounds which are useful as pigments, catalysts and synthetic fibers.

10 Claims, No Drawings

METAL COMPLEX COMPOUNDS OF POLYACYL-2,4-DIHYDRAZINO-5-TRIAZINES

In our copending United States application Ser. No. 471,504 filed concurrently herewith and now U.S. Pat. No. 3,920,611, based upon the corresponding parent German application P 23 26 473.5, filed May 24, 1973, there is disclosed a new fiber- and film-forming polyacyl-2,4-dihydrazino-s-triazine and a process for producing such a polymer. Fibers or films may be either wet spun or dry spun in a conventional manner. The subject matter of this copending application is incorporated herein by reference as fully as if set forth in its entirety.

It is an object of the present invention to provide metal compounds of these polyacyl-2,4-dihydrazino-s-triazines, i.e. polymeric compounds which contain the metal in chemically bound form and which may also be spun into very useful fibers or films. Other objects and advantages of the present invention will become more apparent from the following detailed description.

It has now been found, in accordance with the invention, that one can obtain fibers, films and other useful metal-containing polymer products by providing a complex metal compound of a polyacyl-2,4-dihydrazino-s-triazine, more particularly a polymer consisting essentially of the recurring structural units of the formula

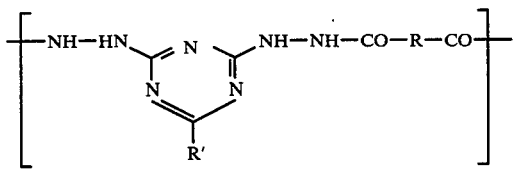

in which R is a divalent aromatic radical of 6 to 15 carbon atoms, and R' is alkyl of 1 to 4 carbon atoms, phenyl, alkoxy of 1 to 4 carbon atoms, phenoxy, dialkylamino of 2 to 8 carbon atoms, piperidyl, morpholyl or phosphonic acid dialkyl ester of 2 to 8 carbon atoms. The metal is chemically bound to at least one of the polymer units and is at least one member selected from the class consisting of the metals of Groups IIa, IIIa, IVa, Va, VIa, VIIa, VIII, Ib, IIb, IIIb, IVb and Vb of the long periodic system of elements. These metal-containing and fiber-forming polymers are obtained by contacting a polyacyl-2,4-dihydrazino-s-triazine having the recurring units of the formula given above, preferably in finely divided or dissolved form, with a liquid solvent containing dissolved therein at least one metal compound soluble in this liquid solvent, the metal being selected from the above-noted Groups of the long periodic system of elements.

The polyacyl-2,4-dihydrazino-s-triazines may be prepared in accordance with our above-noted copending U.S. application by reaction of one or more 2,4-dihydrazino-s-triazines of the formula

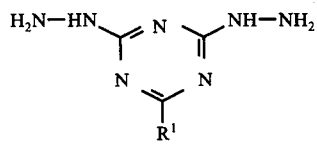

in which R' has the meaning given above, in the presence of an acid acceptor and at a temperature of about −10° C. to +60° C. while stirring and removing the heat of reaction, with one or more aromatic dicarboxylic acid dihalides, especially the dichlorides or dibromides.

Suitable 2,4-dihydrazino-s-triazines are those substituted in the 6-position by the radical R' which represents one of the following groups:

a. lower alkyl, i.e. an alkyl group of 1 to 4 carbon atoms such as methyl, ethyl, propyl, isopropyl or isobutyl;
b. phenyl;
c. lower alkoxy, i.e. an alkoxy group of 1 to 4 carbon atoms such as methoxy, ethoxy, propoxy, butoxy or isobutoxy;
d. phenoxy;
e. dialkylamino in which the alkyl groups are preferably lower alkyl of 1 to 4 carbon atoms and may be the same or different to provide a total of 2 to 8 carbon atoms, for example dimethylamino, diethylamino, dipropylamino, dibutylamino, diisopropylamino, diisobutylamino and N-methyl-N-ethyl-amino;
f. N-piperidyl;
g. N-morpholyl; and
h. phosphonic acid dialkyl esters of 2 to 8 carbon atoms, for example the dimethyl- or diethyl-phosphonic acid esters.

Among these monomeric compounds (II), the following are especially preferred:
2,4-dihydrazino-6-dimethylamino-s-triazine;
2,4-dihydrazino-6-methoxy-s-triazine;
2,4-dihydrazino-6-butoxy-s-triazine;
2,4-dihydrazino-6-phenyl-s-triazine;
2,4-dihydrazino-6-(phosphonic acid diethyl ester)-s-triazine;
2,4-dihydrazino-6-morpholino-s-triazine; and
2,4-dihydrazino-6-phenoxy-s-triazine.

The 2,4-dihydrazino-s-triazines are easily accessible by following known methods of preparation as explained in our above-noted U.S. application.

The aromatic dicarboxylic acid dihalides which may be employed are preferably those represented by the formula

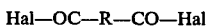

Hal—OC—R—CO—Hal in which R is a divalent aromatic radical of 6 to 15 carbon atoms and Hal is a bromine or chlorine atom. Suitable aromatic radicals are especially phenyl, diphenyl or

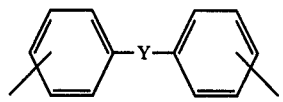

in which Y is one of the bridges —O—, —S—, —SO₂— or —CH₂—, the carboxylic acid halide groups preferably being in the meta- or para-positions with reference to the bridge Y. The following divalent radicals R are particularly useful:

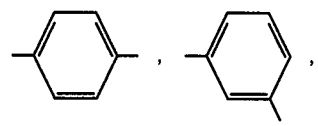

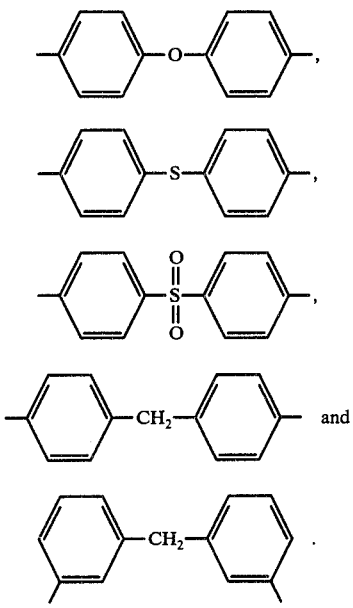

Of these dicarboxylic acid halides, the acid chlorides are especially preferred.

The preparation of the polyacyl-2,4-dihydrazino-s-triazine required as an initial reactant in the present invention takes place by reacting each of the two essential monomeric components, i.e. the 2,4-dihydrazino-s-triazine and the aromatic dicarboxylic chloride or bromide, either in a solution polycondensation process or a so-called interfacial polycondensation process.

According to the solution polycondensation, the two monomeric components are dissolved together in a suitable inert solvent and reacted in a single homogeneous phase. Suitable solvents for this single liquid phase reaction medium are the class of aprotic organic solvents, especially dimethyl acetamide, N-methylpyrrolidone, hexamethylphosphoric acid triamide and tetramethylurea. Mixtures of such solvents are hexamethylphosphoric acid triamide, dimethylacetamide and N-methylpyrrolidone. They should be kept as dry as possible with a water content of not more than about 0.01% by weight.

According to the interfacial polycondensation two immiscible inert solvents are employed to form a two phase liquid reaction medium. One phase is an inert solvent for the 2,4-dihydrazino-s-triazine, especially water but also including the solvents noted above for the single phase or solution condensation reaction. The acid acceptor is preferably dissolved together in the same phase with the 2,4-dihydrazino-s-triazine. As solvents for the dicarboxylic acid dihalide, the following organic solvents are given by way of example: methyl acetate, ethyl acetate, tetrahydrofuran, tetrahydropyran, dioxane, hexane, heptane, cyclohexane, decalin, chloroform, carbon tetrachloride, benzene, toluene, methylene chloride, monochlorobenzene and acetonitrile.

The preferred solvents for the 2,4-dihydrazino-s-triazine and the acid acceptor in the two phase reaction are as follows: water, N-methylacetamide, hexamethylphosphoric acid triamide, dimethyl formamide, N-methylpyrrolidone and tetramethylurea. One naturally selects the individual solvents for the two phases so that they will meet the condition that they form two immiscible phases. This may also be accomplished by adding a salting-out agent to maintain one solvent immiscible in the other solvent. The particular acid acceptor may also function as such a salting-out agent.

As acid acceptors, one may use for example the tertiary organic nitrogen-containing bases including such compounds as pyridine, picoline and triethylamine. One may also employ soda (sodium carbonate) or alkali bicarbonates (sodium or potassium bicarbonates). It is especially advantageous to carry out the polycondensation in the presence of about 5 to 15% by weight (with reference to the amount of reaction medium) of lithium chloride as an agent which has a favorable effect in increasing the degree of polycondensation, i.e. to obtain higher molecular weight polycondensates.

The molecular weight of the polymers required for the present invention depends upon their intended use and the particular method of polycondensation. In general, in order to provide complex metal compounds according to the invention, it is desirable to provide polycondensates which exhibit a reduced viscosity ($h_{red}$) of about 0.9 to 11. Unless otherwise indicated, such values of reduced viscosity are measured throughout this specification as a solution of one gram of the polymer in 100 ml. of 98% formic acid at 20° C. The following polycondensates are considered to be of special value in forming the complex metal compounds of fiber-forming polymers according to the present invention:

Poly-terephthaloyl-2,4-dihydrazino-6-dimethylamino-s-triazine;
Poly-terephthaloyl-2,4-dihydrazino-6-methoxy-s-triazine;
Poly-terephthaloyl-2,4-dihydrazino-6-butoxy-s-triazine;
Poly-terephthaloyl-2,4-dihydrazino-6-phenyl-s-triazine;
Poly-terephthaloyl-2,4-dihydrazino-6-phosphonic acid diethyl ester-s-triazine;
Poly-isophthaloyl-2,4-dihydrazino-6-dimethylamino-s-triazine;
Poly-isophthaloyl-2,4-dihydrazino-6-methoxy-s-triazine;
Poly-isophthaloyl-2,4-dihydrazino-6-butoxy-s-triazine;
Poly-isophthaloyl-2,4-dihydrazino-6-phenyl-s-triazine;
Poly-isophthaloyl-2,4-dihydrazino-6-phosphonic acid diethyl ester-s-triazine;
Poly-diphenylether-4,4'-dicarboxylic acid-2,4-dihydrazino-6-dimethylamino-s-triazine;
Poly-diphenylether-4,4'-dicarboxylic acid-2,4-dihydrazino-6-methoxy-s-triazine;
Poly-diphenylether-4,4'-dicarboxylic acid-2,4-dihydrazino-6-butoxy-s-triazine;
Poly-diphenylether-4,4'-dicarboxylic acid-2,4-dihydrazino-6-phenyl-s-triazine; and
Poly-diphenylether-4,4'-dicarboxylic acid-2,4-dihydrazino-6-phosphonic acid diethyl ester-s-triazine.

The polyacyl-2,4-dihydrazino-s-triazine to be combined with the metal may be in solid form, for example as a powder or granulate or even in the form of fibers, fabrics, films or the like. The solid polymer in this form can be immersed or dipped into a bath containing a solution of the metal compound. It is also possible, however, to spray a solution of the metal compound onto the solid polymer. On the other hand, it is especially useful to first dissolve the polyacyl-2,4-dihydrazino-s- triazine in a suitable solvent, e.g. in dimethylformamide containing lithium chloride and to react the polymer in this manner to combine at least one metal therewith. Suitable metal compounds to be reacted with the polymer include inorganic and organic salts or even other complex compounds of the above-noted metals. It is only necessary that such metal compounds be soluble in an otherwise inert solvent which can then be brought into intimate contact with the polymer.

For example, it is suitable to react solutions of one or more metals as their compounds dissolved in water, methanol, dimethylformamide, dimethylacetamide, N-methylpyrrolidone, dimethylsulfoxide or mixtures of such solvents. Metal solutions which are especially useful as mixtures are as follows: dimethylformamide/water; dimethylformamide/methanol; methanol/dilute ammonia; water/amines; and methanol/amines.

The amount of metal taken up by the polymer is influenced by a variety of parameters, but it is possible to conduct simple preliminary tests to determine the most favorable treatment conditions in preparing any particular metal compound of a polyacyl-2,4-dihydrazino-s-triazine. Also, one can readily determine a saturation limit of the polymer for the metal. The following techniques may be used as having the greatest influence on the amount of metal being combined with the polymer:

1. The amount of metal taken up increases with the length of the treatment period up to the saturation concentration. For example, the amount of metal combined with polydiphenylether-4,4'-dicarboxylic acid-2,4-dihydrazino-6-dimethylamino-s-triazine from an alkaline ammonium 10% by weight aqueous solution of zinc or strontium chloride with a pH-value of 12.5 after a period of 1 hour is 3.0% and 2.6% by weight, respectively, after a period of 2 hours is 3.9% and 3.3% by weight, respectively, and after 3 hours is 7.8% and 4.5% by weight, respectively. The percentages by weight for the take-up of the metal are taken with reference to the polymer in each instance.

2. The amount of metal which may be combined with the polymer, all other parameters being constant, depends upon the chemical composition of the polymer and also upon the particular metal salt. For example, polydiphenylether-4,4'-dicarboxylic acid-2,4-dihydrazino-6-dimethylamino-s-triazine at room temperature within a period of 5 hours from solutions of 0.05 mols of a copper salt in 100 ml. water takes up 2.0% by weight using a copper nitrate solution, 3.5% by weight using a copper sulfate solution, 5.7% by weight using a copper chloride solution and 9.0% by weight using a copper acetate solution.

3. An increase in the concentration of the metal salt in the treatment solution or bath causes a greater take-up of the metal within the same treatment period. For example, the following table summarizes the take-up of copper by polydiphenylether-4,4'-dicarboxylic acid-2,4-dihydrazino-6-dimethylamino-s-triazine from a methanolic $CuCl_2 \cdot H_2O$ solution over a period of 6 hours at 20° C. in each case:

| Conc. of Copper salt Solution-% by wt. | 1 | 2 | 3 | 4 | 5 | 6 | 7 | 8 |
|---|---|---|---|---|---|---|---|---|
| Copper Content of polymer- | 12.1 | 14.3 | 14.4 | 14.6 | 14.7 | 14.8 | 16.0 | 16.6 |

-continued

% by wt.

4. Increasing the temperature generally causes a more rapid metal take-up by the polymer. In most cases, however, the metal is taken up sufficiently fast that the treatment of the polymer can be advantageously carried out at about room temperature. By way of example, polydiphenylether-4,4'-dicarboxylic acid-2,4-dihydrazino-6-dimethylamino-s-triazine takes up from a 10% by wt. aqueous solution of cobalt acetate within 3 hours: approximately 1.1% by wt. of cobalt at 22° C.; 1.4% by wt. of cobalt at 50° C.; and 1.6% by wt. of cobalt at 70° C.

5. The amount of metal taken up depends relatively strongly on the pH-value of the solution of the metal compound.

6. Where the polymer has a high degree of swelling or is at least partially dissolved in the solvent, the rate at which the metal is taken up becomes higher. The swelling or dissolution of the polymer can be caused by the solvent used for the metal salt solution and/or by another suitable solvent or swelling agent.

The reaction or treatment of the polymer with the metal salt is preferably conducted at about room temperature. However, temperatures up to the boiling temperature of the solution or treatment liquid are useful.

The concentration of the metal compound in the solvent medium can be chosen over a wide range up to the saturation concentration in the particular solvent. In most cases, it is desirable to work with a relatively concentrated solution, i.e. as concentrated as possible without handling solid metal compounds.

The metal is chemically bound to the polymer so as to form a so-called complex compound, for example with the kind of bonding found in enolates or similar chelated compounds. The proportion of the metal can range from very slight amounts, e.g. 0.1% by weight with reference to the polymer, up to the saturation point of the polymer. This saturation point is defined herein as the maximum amount of the metal capable of being chemically bound to the polymer or, in a more practical sense, the maximum amount of metal taken up by the polymer when contacted with a solution of the metal for an extended period of time, e.g. several days.

Although the metallized polymers of the invention may be those which contain only one metal, it will be appreciated that two or more metals can be bound to the same polymer or that one may use mixtures of different polymers with the same or different metals.

Most of the metallized polymers of the invention are colored compounds which do not sinter and do not even soften as a practical matter. Accordingly, these polymer products containing one or more metals can very dimensionally stable over a wide range of temperatures and cannot be destroyed or easily decomposed by heat. They possess a strong coloration, depending upon the metal combined in each case, so that further dyeing or pigmentation is unnecessary. However, it is also possible to aftertone or tint the metallized polymers of the invention with conventional dyes or pigments, including dispersion dyes, metal complex dyes, substantive dyes and basic or acid dyes.

In finely divided form, the metallized polymer products of the invention represent thermally stable dye pigments, i.e. pigments which are heat-stable or heat-resistant, and these novel pigments can be used in a wide variety of technical applications. The size of pigment particles of the metallized polymer will ordinarily range from about 0.1 to 1 microns or in such sizes as are commonly required for particular applications. Because of their heat-resistance, these pigments are especially useful for coloring thermoplastic or thermosetting polymers or other substances which undergo relatively high temperatures in their preparation or use.

The metallized polymers also represent valuable metal compounds which can be used where lower molecular weight metal compounds cannot be introduced, for example where the usual metal compounds such as inorganic or organic salts are too soluble or too easily decomposed. In this respect the new metal compounds of polyacyl-2,4-dihydrazino-s-triazines are especially useful to act as metal catalyst in catalytic processes.

Particularly valuable and interesting products from a technological viewpoint are the fibers or filaments which can be produced with the metallized polymers of the present invention, e.g. in the form of threads, yarns, staple fibers, fabrics or the like. These fiber-forming metal compounds of a polyacyl-2,4-dihydrazino-s-triazine should contain not more than about 20% by weight of the metal, generally at least about 0.1% by weight and preferably about 1 to 15% by weight. Filaments or fibers of a metallized polymer with these amounts of the metal possess very useful and improved fiber properties in terms of strength, thermal stability, antistatic effects, permanent coloration as well as other satisfactory or enhanced textile properties. By using the metals zinc, tin, cadmium, barium, strontium, calcium, antimony, tantalum or mixtures thereof in a sufficient amount, the filaments or fibers can also be made flame-resistant or non-flammable. Even when incorporated in fabrics or similar textiles in a minor proportion, such fibers provide a substantial improvement in specific applications.

The invention is further explained by the following illustrative examples which are first described in terms of the process used to form the metal compound of the polyacyl-2,4-dihydrazino-s-triazine, the results being given in the table below. In this table, the polymer is defined with reference to the structural formula of its recurring unit where the radicals R and R' are the only variables and are identified hereinafter by number as follows:

| Number | Radical |
|--------|---------|
| 1 | $-OC_4H_9$ |
| 2 | $-OC_6H_5$ |
| 3 | 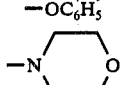 |
| 4 | $-PO(OC_2H_5)_2$ |
| 5 | $-N(CH_3)_2$ |
| 6 | $-OCH_3$ |
| 7 | 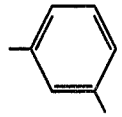 |
| 8 | 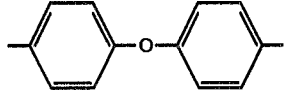 |
| 9 |  |

-continued

| Number | Radical |
|--------|---------|
| 10 | $-C_6H_5$ |

The radical No. 2 may also be identified as phenoxy while No. 10 is phenyl. The remaining columns of the Table below identify the particular metal salt, the amount of metal taken up by the polymer and the color of the final metallized polymer product.

EXAMPLES 1 TO 13

100 ml. of a 10% by wt. aqueous metal salt solution was added to a 25% by wt. aqueous ammonium solution such that there was obtained a solution with a pH-value in the range of 12 to 12.5. At room temperature, 2 grams of the polymer as a solid powder was stirred in this solution for a period of 17 hours. The resulting product was filtered by suction, washed with water and dried under vacuum at 70° C.

EXAMPLES 14 TO 16

100 ml. of a 10% by weight aqueous barium hydroxide solution and 2 grams of the solid polymer in powder form were stirred at room temperature for 17 hours. The resulting product was filtered by suction, washed with water and dried under vacuum at 70° C.

EXAMPLES 17 TO 46

100 ml. of a 10% by weight aqueous metal salt solution was treated with ammonia until the precipitated metal hydroxide again just dissolved. In this ammoniacal metal salt solution, 3 grams of the finely divided polymer were introduced and stirred for a period of 20 hours at room temperature. Then, the metal compound of the polymer was filtered off and washed with water until the filtrate gave a neutral reaction. The product was finally dried under vacuum at 70° C.

EXAMPLES 47 TO 54

In 100 ml. of a 10% by wt. metal salt solution in dimethyl formamide, 2 grams of the polymer were suspended and stirred for a period of 17 hours at room temperature. In the case of the antimony and silver compounds, the product was precipitated from the reaction mixture by addition of acetone. In all of the remaining cases, the reaction product was obtained as a difficulty soluble precipitate. The products were thoroughly washed with water and methanol and finally dried under vacuum at 70° C.

EXAMPLES 55 TO 96

2 grams of the polymer were stirred for 6 hours at 65° C. in 100 ml. of an 0.3 molar solution of the metal salt in methanol. The resulting product was filtered off, washed several times with methanol and dried under vacuum at 50° C. to a constant weight.

EXAMPLES 97 TO 159

2 grams of the polymer were dissolved in 30 ml. of dimethyl formamide and stirred for 6 hours with a solution of 10 grams of metal salt in 70 ml. of methanol. The mixture was then heated for another 2 hours under reflux and then stirred for still another 17 hours at room temperature. The product was suction filtered, thoroughly washed with methanol and dried under vacuum at 60° C. In the use of lead acetate and antimony trichloride, the metal compound of the polymer was precipitated from the reaction mixture by addition of acetone.

EXAMPLES 160 TO 175

2 grams of the polymer were suspended in 100 ml. of a 10% by weight methanolic solution of the metal salt and stirred at room temperature for 24 hours. The product was suction filtered, washed several times with methanol and dried under vacuum at 60° C. This general procedure was followed except in the case of the gold, thorium and tantalum salts where 1 gram of the polymer was reacted in 30 ml. of a 5% by weight methanolic solution of the metal salt.

EXAMPLES 176 TO 182

The reaction took place in the same manner as described in Examples 97 to 159, using dimethyl formamide/methanol as the solvent mixture.

EXAMPLES 183 TO 186

5 grams of the polymer were heated for 18 hours under reflux in 100 grams of a 10% by wt. methanolic metal salt solution. The metal compound of the polymer was suction filtered and after washing several times with methanol, dried under vacuum at 70° C.

EXAMPLES 187 TO 198

5 grams of the polymer were suspended in 100 ml. of a 10% by wt. methanolic metal salt solution and stirred for 17 hours at room temperature. The resulting metal compound of the polymer was suction filtered, washed several times with methanol and dried under vacuum at 70° C.

EXAMPLES 199 TO 203

2 grams of the polymer were stirred in 50 grams of a 2% by wt. methanolic metal salt solution for 17 hours at 20° C. The resulting metal compound of the polymer was suction filtered, washed several times with methanol and dried under vacuum at 70° C.

EXAMPLES 204 TO 206

5 grams of the polymer were suspended in a saturated methanolic solution of the metal salt and stirred for 17 hours at room temperature. The obtained metal compound of the polymer was suction filtered, washed several times with methanol and dried under vacuum at 70° C.

EXAMPLES 207 TO 218

10 grams of the metal salt were dissolved in 90 grams of dimethyl formamide. 5 grams of the polymer were stirred in this solution for 17 hours. The metal compound of the polymer was suction filtered, washed several times with methanol and dried under vacuum. In some instances, the metal compound of the polymer remained dissolved in the reaction mixture, and these products were precipitated by the addition of methylene chloride.

EXAMPLES 219 TO 223

2 grams of the polymer were dissolved in 50 grams of a 2% by wt. metal salt solution in dimethyl formamide and then treated exactly as described in Examples 207 to 218.

EXAMPLES 224 TO 227

The same procedure was followed as in Examples 207 to 218 except that saturated solutions of the metal salt were employed instead of the more dilute solutions described in these preceding examples.

EXAMPLES 228 TO 235

The reaction with barium and strontium hydroxide took place in a saturated aqueous hydroxide solution, in which the polymer was stirred for 2 hours at room temperature. In all other cases, 100 grams of a 10% by wt. aqueous metal salt solution was adjusted to a pH-value of 12.5 with ammonia and then stirred with 5 grams of the polymer for 17 hours at 20° C. Then the product was suction filtered, washed with water and methanol and finally dried under vacuum at 70° C.

The following is the table of the results of Examples 1 to 235.

| Ex. No. | R' | R | Metal Salt or Hydroxide | Metal Content % by weight | Color |
|---|---|---|---|---|---|
| 1 | 1 | 7 | $CuCl_2 \cdot 2H_2O$ | 21.9 | yellow-brown |
| 2 | 1 | 7 | $ZnCl_2$ | 19.5 | yellow |
| 3 | 1 | 7 | $NiCl_2 \cdot 6H_2O$ | 12.0 | brown |
| 4 | 2 | 7 | $CuCl_2 \cdot 2H_2O$ | 20.3 | gray |
| 5 | 2 | 7 | $AgNO_3$ | 25.3 | brown |
| 6 | 10 | 7 | $CaCl_2$ | 2.8 | yellow |
| 7 | 10 | 7 | $CuCl_2 \cdot 2H_2O$ | 19.8 | green |
| 8 | 10 | 7 | $AgNO_3$ | 31.6 | yellow |
| 9 | 10 | 7 | $ZnCl_2$ | 21.6 | yellow |
| 10 | 3 | 7 | $CuCl_2 \cdot 2H_2O$ | 22.3 | green |
| 11 | 3 | 7 | $AgNO_3$ | 31.4 | brown |
| 12 | 4 | 7 | $ZnCl_2$ | 23.2 | yellow |
| 13 | 3 | 8 | $CuCl_2 \cdot 2H_2O$ | 22.2 | gray |
| 14 | 3 | 7 | $Ba(OH)_2$ | 21.2 | rust-brown |
| 15 | 4 | 7 | $Ba(OH)_2$ | 32.0 | yellow |
| 16 | 3 | 7 | $Ba(OH)_2$ | 21.3 | light-brown |
| 17 | 5 | 7 | $CuCl_2$ | 26.1 | black |
| 18 | 5 | 7 | $AgNO_3$ | 36.4 | brown |
| 19 | 5 | 7 | $CaCl_2$ | 3.4 | yellow |
| 20 | 5 | 7 | $ZnCl_2$ | 19.8 | yellow |
| 21 | 5 | 7 | $SrCl_2 \cdot 6H_2O$ | 15.9 | light-brown |
| 22 | 5 | 7 | $BaCl_2 \cdot 2 H_2O$ | 14.7 | dull-green |
| 23 | 5 | 7 | $NiCl_2 \cdot 6 H_2O$ | 23.6 | light-brown |
| 24 | 5 | 7 | $CdCl_2$ | 29.4 | dark-yellow |
| 25 | 5 | 7 | $CoCl_2 \cdot 6 H_2O$ | 20.1 | dark-brown |
| 26 | 5 | 7 | $FeCl_2 \cdot 4 H_2O$ | 22.9 | black |
| 27 | 5 | 7 | $MnCl_2 \cdot 4 H_2O$ | 16.8 | brown |
| 28 | 5 | 9 | $CuCl_2$ | 26.4 | black |
| 29 | 5 | 9 | $AgNO_3$ | 42.2 | dark-brown |
| 30 | 5 | 9 | $CaCl_2$ | 7.8 | dark-yellow |
| 31 | 5 | 9 | $ZnCl_2$ | 21.8 | yellow |
| 32 | 5 | 9 | $SrCl_2 \cdot 6 H_2O$ | 1.7 | yellow |
| 33 | 5 | 9 | $BaCl_2 \cdot 2 H_2O$ | 2.8 | dark-yellow |
| 34 | 5 | 9 | $NiCl_2 \cdot 6 H_2O$ | 6.9 | dark-brown |
| 35 | 5 | 9 | $CdCl_2$ | 36 | green |
| 36 | 5 | 9 | $CoCl_2 \cdot 6 H_2O$ | 25.7 | black |
| 37 | 5 | 9 | $FeCl_2 \cdot 4 H_2O$ | 30.8 | black |
| 38 | 5 | 9 | $MnCl_2 \cdot 4 H_2O$ | 12.6 | brown |
| 39 | 6 | 7 | $CuCl_2$ | 30.8 | black |
| 40 | 6 | 7 | $ZnCl_2$ | 27.4 | yellow |
| 41 | 6 | 7 | $SrCl_2 \cdot 6 H_2O$ | 14.8 | yellow |
| 42 | 6 | 7 | $NiCl_2 \cdot 6 H_2O$ | 18.0 | brown |
| 43 | 6 | 9 | $CuCl_2$ | 30.9 | black |
| 44 | 6 | 9 | $ZnCl_2$ | 28.7 | yellow |
| 45 | 6 | 9 | $SrCl_2 \cdot 6 H_2O$ | 12.2 | yellow |
| 46 | 6 | 9 | $NiCl_2 \cdot 6 H_2O$ | 29.2 | brown |
| 47 | 3 | 7 | $SnCl_2 \cdot 2H_2O$ | 33.5 | white |
| 48 | 3 | 7 | $SbCl_3$ | 11.5 | yellowish |
| 49 | 3 | 7 | $AgNO_3$ | 27.2 | brown |
| 50 | 3 | 7 | $Ni(OOCCH_3)_2$ | 15.1 | brown-yellow |

-continued

| Ex. No. | R' | R | Metal Salt or Hydroxide | Metal Content % by weight | Color |
|---|---|---|---|---|---|
| 51 | 3 | 8 | SnCl$_2$ . 2H$_2$O | 29.1 | white |
| 52 | 1 | 7 | Zn(OOCCH$_3$)$_2$ . 2H$_2$O | 23.2 | yellowish |
| 53 | 10 | 7 | FeCl$_3$ . 6H$_2$O | 10.6 | black |
| 54 | 10 | 7 | NiCl$_2$ | 3.5 | yellow-green |
| 55 | 5 | 7 | CuCl$_2$ . 2H$_2$O | 16.8 | black |
| 56 | 5 | 7 | ZnCl$_2$ . 2H$_2$O | 7.8 | white |
| 57 | 5 | 7 | NiCl$_2$ . 6H$_2$O | 6.4 | black |
| 58 | 5 | 7 | MnCl$_2$ . 4H$_2$O | 1.3 | white |
| 59 | 5 | 7 | SnCl$_2$ . 2H$_2$O | 26.4 | white |
| 60 | 5 | 7 | Pb(OAc)$_2$ . 2H$_2$O | 46.6 | yellow |
| 61 | 5 | 7 | Cd(NO$_3$)$_2$ . 2H$_2$O | 9.3 | pale-yellow |
| 62 | 5 | 7 | SbCl$_3$ | 4.0 | white |
| 63 | 5 | 7 | CaCl$_2$ | 1.4 | white |
| 64 | 5 | 7 | AgNO$_3$ | 25.9 | yellow |
| 65 | 5 | 7 | HgCl$_2$ | 4.7 | white |
| 66 | 5 | 7 | FeCl$_3$ . 6H$_2$O | 8.6 | dark-blue |
| 67 | 5 | 7 | CeCl$_3$ . 6H$_2$O | 3.0 | white |
| 68 | 5 | 7 | LaCl$_3$ . 7H$_2$O | 6.2 | yellow |
| 69 | 5 | 7 | NbCl$_3$ | 2.5 | yellow |
| 70 | 5 | 7 | VCL$_3$ | 5.1 | olive-green |
| 71 | 5 | 7 | Th(NO$_3$)$_4$ . 4H$_2$O | 30.0 | white |
| 72 | 5 | 7 | MoCl$_5$ | 2.0 | rust-brown |
| 73 | 5 | 9 | CuCl$_2$ . 2H$_2$O | 18.9 | black |
| 74 | 5 | 9 | ZnCl$_2$ . 2H$_2$O | 10.1 | yellow |
| 75 | 5 | 9 | NiCl$_2$ . 6H$_2$O | 17.7 | olive-green |
| 76 | 5 | 9 | MnCl$_2$ . 4H$_2$O | 2.6 | yellow |
| 77 | 5 | 9 | SnCl$_2$ . 2H$_2$O | 20.2 | yellow |
| 78 | 5 | 9 | Pb(OAc)$_2$ . 3H$_2$O | 47 | yellow |
| 79 | 5 | 9 | Cd(NO$_3$)$_2$ . 4H$_2$O | 6.1 | yellow |
| 80 | 5 | 9 | SbCl$_3$ | 0.8 | yellow |
| 81 | 5 | 9 | CaCl$_3$ | 0.7 | yellow |
| 82 | 5 | 9 | AgNO$_3$ | 33.9 | olive-green |
| 83 | 5 | 9 | FeCl$_3$ . 6H$_2$O | 8.5 | black |
| 84 | 5 | 9 | LaCl$_3$ . 7H$_2$O | 8.0 | yellow |
| 85 | 5 | 9 | CeCl$_3$ . 6H$_2$O | 9.8 | yellow |
| 86 | 5 | 9 | NbCl$_3$ | 0.5 | white |
| 87 | 5 | 9 | VCl$_3$ | 2.9 | olive-green |
| 88 | 5 | 9 | MoCl$_5$ | 0.5 | white |
| 89 | 6 | 7 | CuCl$_2$ . 2H$_2$O | 14.5 | black |
| 90 | 6 | 7 | ZnCl$_2$ | 5.7 | white |
| 91 | 6 | 7 | NiCl$_2$ . 6H$_2$O | 5.1 | yellow |
| 92 | 6 | 7 | MnCl$_2$ . 4H$_2$O | 2.7 | white |
| 93 | 6 | 7 | SnCl$_2$ . 2H$_2$O | 15.1 | white |
| 94 | 6 | 7 | SbCl$_3$ | 2.2 | white |
| 95 | 6 | 7 | FeCl$_3$ . 6H$_2$O | 8.4 | black |
| 96 | 6 | 7 | VCl$_3$ | 1.9 | light-brown |
| 97 | 1 | 7 | Mg(Ac)$_2$ . 2H$_2$O | 1.7 | yellowish |
| 98 | 1 | 7 | Ca(Ac)$_2$ . 2H$_2$O | 1.3 | yellowish |
| 99 | 1 | 7 | Sr(OH)$_2$ . 8H$_2$O | 13.1 | green-yellow |
| 100 | 1 | 7 | AlCl$_3$ . 6H$_2$O | 0.3 | white |
| 101 | 1 | 7 | SnCl$_2$ . 2H$_2$O | 30.7 | white |
| 102 | 1 | 7 | Pb(Ac)$_2$ . 3H$_2$O | 39.7 | yellow |
| 103 | 1 | 7 | Cu(Ac)$_2$ . 2H$_2$O | 27.4 | brown |
| 104 | 1 | 7 | Zn(Ac)$_2$ . 2H$_2$O | 20.6 | yellowish |
| 105 | 2 | 7 | MgCl$_2$ . 6H$_2$O | 0.2 | white |
| 106 | 2 | 7 | Sr(OH)$_2$ . 2H$_2$O | 19.1 | yellow |
| 107 | 2 | 7 | AlCl$_3$ . 6H$_2$O | 0.1 | white |
| 108 | 2 | 7 | SnCl$_2$ . 2H$_2$O | 22.0 | white |
| 109 | 2 | 7 | Pb(Ac)$_2$ . 3H$_2$O | 14.0 | yellow |
| 110 | 2 | 7 | Zn(Ac)$_2$ . 2H$_2$O | 27.1 | yellow |
| 111 | 10 | 7 | Sr(OH)$_2$ . 2H$_2$O | 13.0 | yellow |
| 112 | 10 | 7 | SnCl$_2$ . 2H$_2$O | 30.8 | yellow |
| 113 | 10 | 7 | Pb(Ac)$_2$ . 3H$_2$O | 35.2 | yellowish |
| 114 | 3 | 7 | Mg(Ac)$_2$ . H$_2$O | 0.3 | white |
| 115 | 3 | 7 | Ca(Ac)$_2$ . 2H$_2$O | 0.3 | yellowish |
| 116 | 3 | 7 | Sr(OH)$_2$ . 8H$_2$O | 14.5 | beige |
| 117 | 3 | 7 | AlCl$_3$ . 6H$_2$O | 0.1 | white |
| 118 | 3 | 7 | SnCl$_2$ . 2H$_2$O | 26.9 | white |
| 119 | 3 | 7 | Pb(Ac)$_2$ . 3H$_2$O | 38.6 | yellow |
| 120 | 3 | 7 | Zn(Ac)$_2$ . 2H$_2$O | 21.9 | yellowish |
| 121 | 4 | 7 | MgCl$_2$ . 6H$_2$O | 0.6 | green-yellow |
| 122 | 4 | 7 | Ca(Ac)$_2$ . 2H$_2$O | 0.6 | yellowish |
| 123 | 4 | 7 | Pb(Ac)$_2$ . 3H$_2$O | 32.4 | yellow |
| 124 | 4 | 7 | SbCl$_3$ | 10.6 | yellow |
| 125 | 4 | 7 | Cu(Ac)$_2$ . 2H$_2$O | 26.3 | olive-green |
| 126 | 4 | 7 | Zn(Ac)$_2$ . 2H$_2$O | 32.9 | yellow |
| 127 | 1 | 7 | Cd(Ac)$_2$ . 2H$_2$O | 20.3 | yellowish |
| 128 | 1 | 7 | Hg(Ac)$_2$ | 21.0 | yellow |
| 129 | 1 | 7 | CrCl$_3$ | 6.0 | green |
| 130 | 1 | 7 | Mn(Ac)$_2$ . H$_2$O | 8.4 | brown |
| 131 | 1 | 7 | FeCl$_3$ . 6H$_2$O | 4.3 | blue |
| 132 | 1 | 7 | Co(Ac)$_2$ . 4H$_2$O | 18.5 | brown |
| 133 | 1 | 7 | Ni(Ac)$_2$ | 13.5 | brown |
| 134 | 2 | 7 | Cd(Ac)$_2$ . 3H$_2$O | 26.5 | yellow-green |
| 135 | 2 | 7 | Hg(Ac)$_2$ | 19.6 | yellow |
| 136 | 2 | 7 | CrCl$_3$ | 3.9 | olive-green |
| 137 | 2 | 7 | Mn(Ac)$_2$ . H$_2$O | 10.5 | olive-green |
| 138 | 2 | 7 | FeCl$_3$ . 6H$_2$O | 1.4 | black |
| 139 | 2 | 7 | Co(Ac)$_2$ . H$_2$O | 30.5 | light-brown |
| 140 | 2 | 7 | NiCl$_2$ . 6H$_2$O | 3.2 | green |
| 141 | 10 | 7 | Cd(Ac)$_2$ . 2H$_2$O | 29.3 | brown |
| 142 | 10 | 7 | Hg(Ac)$_2$ | 26.5 | red-brown |
| 143 | 10 | 7 | Mn(Ac)$_2$ . H$_2$O | 12.5 | olive-green |
| 144 | 10 | 7 | Co(Ac)$_2$ . 4H$_2$O | 29.8 | light-brown |
| 145 | 10 | 7 | NiCl$_2$ . 6H$_2$O | 3.5 | yellow-green |
| 146 | 3 | 7 | Cd(Ac)$_2$ . 2H$_2$O | 21.2 | yellow-green |
| 147 | 3 | 7 | Hg(Ac)$_2$ | 24.5 | yellow |
| 148 | 3 | 7 | CrCl$_3$ | 3.0 | weak-green |
| 149 | 3 | 7 | Mn(Ac)$_2$ . H$_2$O | 11.2 | light-brown |
| 150 | 3 | 7 | FeCl$_3$ . 6H$_2$O | 5.7 | dark-brown |
| 151 | 3 | 7 | Co(Ac)$_2$ . 4H$_2$O | 26.5 | light-brown |
| 152 | 4 | 7 | Cd(Ac)$_2$ . 2H$_2$O | 24.7 | yellow |
| 153 | 4 | 7 | Hg(Ac)$_2$ | 21.8 | red-brown |
| 154 | 4 | 7 | CeCl$_3$ . 6H$_2$O | 14.2 | light-brown |
| 155 | 4 | 7 | CrCl$_3$ | 5.9 | yellowish |
| 156 | 4 | 7 | Mn(Ac)$_2$ . H$_2$O | 5.4 | olive-green |
| 157 | 4 | 7 | FeCl$_3$ . 6H$_2$O | 7.8 | black |
| 158 | 4 | 7 | Co(Ac)$_2$ . 4H$_2$O | 22.8 | brown |
| 159 | 4 | 7 | NiCl$_2$ . 6H$_2$O | 9.8 | dark-green |
| 160 | 4 | 7 | CaCl$_2$ | 3.4 | white |
| 161 | 4 | 7 | Sr(OH)$_2$ . 8H$_2$O | 27.4 | yellow |
| 162 | 4 | 7 | SnCl$_2$ . 2H$_2$O | 37.5 | yellow |
| 163 | 4 | 7 | BiCl$_3$ | 12.4 | yellowish |
| 164 | 4 | 7 | Zn(Ac)$_2$ . 2H$_2$O | 29.6 | yellow |
| 165 | 4 | 7 | ZrCl$_4$ | 31.0 | yellowish |
| 166 | 4 | 7 | FeCl$_3$ . 6H$_2$O | 7.8 | black |
| 167 | 4 | 7 | Co(Ac)$_2$ . 4H$_2$O | 22.8 | brown |
| 168 | 3 | 7 | FeCl$_3$ | 4.7 | dark-brown |
| 169 | 3 | 7 | SnCl$_2$ . 2H$_2$O | 19.6 | white |
| 170 | 3 | 7 | H(AuCl$_4$) . H$_2$O | 11.2 | yellow |
| 171 | 3 | 7 | Th(NO$_3$)$_4$ . 4H$_2$O | 8.0 | white |
| 172 | 3 | 7 | TaCl$_5$ | 0.5 | white |
| 173 | 3 | 7 | MoCl$_5$ | 0.5 | rust-brown |
| 174 | 1 | 7 | FeCl$_3$ . 6H$_2$O | 4.3 | dark-brown |
| 175 | 1 | 7 | SnCl$_2$ . 2H$_2$O | 18.1 | white |
| 176 | 2 | 8 | Zn(Ac)$_2$ . 2H$_2$O | 24.0 | white |
| 177 | 2 | 8 | Sr(OH)$_2$ . 8H$_2$O | 18.0 | beige |
| 178 | 3 | 8 | Zn(Ac)$_2$ . 2H$_2$O | 17.3 | white |
| 179 | 3 | 8 | Sr(OH)$_2$ . 8H$_2$O | 14.3 | white |
| 180 | 3 | 8 | SnCl$_2$ . 2H$_2$O | 30.7 | white |
| 181 | 4 | 8 | Zn(Ac)$_2$ . 2H$_2$O | 23.0 | yellow |
| 182 | 4 | 8 | SnCl$_2$ . 2H$_2$O | 6.3 | yellow |
| 183 | 6 | 8 | CuCl$_2$ | 11.5 | black |
| 184 | 6 | 8 | SnCl$_2$ . 2H$_2$O | 11.6 | yellow-orange |
| 185 | 6 | 8 | FeCl$_3$ | 5.5 | Blue-black |
| 186 | 6 | 8 | ZnCl$_2$ . 2H$_2$O | 13.5 | white |
| 187 | 5 | 8 | SnCl$_2$ . 2H$_2$O | 18.2 | yellowish |
| 188 | 5 | 8 | Pb(Ac)$_2$ . 3H$_2$O | 34.9 | yellow |
| 189 | 5 | 8 | SbCl$_3$ | 7.8 | white |
| 190 | 5 | 8 | ZnCl$_2$ | 10.9 | white |
| 191 | 5 | 8 | HgCl$_2$ | 10 | white |
| 192 | 5 | 8 | CeCl$_3$ . 6H$_2$O | 12.5 | white |
| 193 | 5 | 8 | LaCl$_3$ . 7H$_2$O | 12.0 | white |
| 194 | 5 | 8 | ZrCl$_4$ | 1.3 | light-green |
| 195 | 5 | 8 | CrCl$_3$ . 6H$_2$O | 2.4 | light-green |

-continued

| Ex. No. | R' | R | Metal Salt or Hydroxide | Metal Content % by weight | Color |
|---|---|---|---|---|---|
| 196 | 5 | 8 | Mn(Ac)$_2$ . 2,5H$_2$O | 7.6 | light-yellow |
| 197 | 5 | 8 | Co(Ac)$_2$ . 4H$_2$O | 7.8 | brown |
| 198 | 5 | 8 | NiCl$_2$ . 6H$_2$O | 6.7 | green |
| 199 | 5 | 8 | Ga(NO$_3$)$_3$ . 8H$_2$O | 3.7 | white |
| 200 | 5 | 8 | HAuCl$_4$ | 16.4 | ocher |
| 201 | 5 | 8 | TaCl$_5$ | 0.5 | white |
| 202 | 5 | 8 | MoCl$_5$ | 2.2 | light-brown |
| 203 | 5 | 8 | WCl$_6$ | 3.0 | light-green |
| 204 | 5 | 8 | Al-isopropylat | 0.1 | white |
| 205 | 5 | 8 | Ag$_2$SO$_4$ | 14.5 | pink |
| 206 | 5 | 8 | RuCl$_3$ | 0.5 | white |
| 207 | 5 | 8 | MgCl$_2$ . 6H$_2$O | 4.9 | white |
| 208 | 5 | 8 | SnCl$_2$ . 2H$_2$O | 19.1 | white |
| 209 | 5 | 8 | Pb(Ac)$_2$ . 3H$_2$O | 40.8 | yellow |
| 210 | 5 | 8 | BiCl$_3$ | 19.5 | green |
| 211 | 5 | 8 | CuCl$_2$ . 2H$_2$O | 15.6 | gray-black |
| 212 | 5 | 8 | Cd(Ac)$_2$ . 2H$_2$O | | |
| 213 | 5 | 8 | HgCl$_2$ | 0.7 | gray |
| 214 | 5 | 8 | CeCl$_3$ . 6H$_2$O | 6.3 | yellowish |
| 215 | 5 | 8 | LaCl$_3$ . 7H$_2$O | 6.8 | white |
| 216 | 5 | 8 | ZrCl$_4$ | 0.8 | bluish |
| 217 | 5 | 8 | FeCl$_2$ . 4H$_2$O | 16.0 | green-black |
| 218 | 5 | 8 | FeCl$_3$ . 6H$_2$O | 9.8 | black |
| 219 | 5 | 8 | Ga(NO$_3$)$_3$ . 8H$_2$O | 6.5 | white |
| 220 | 5 | 8 | NbCl$_5$ | 0.5 | white |
| 221 | 5 | 8 | TaCl$_5$ | 2.6 | yellowish |
| 222 | 5 | 8 | MoCl$_5$ | 0.5 | white |
| 223 | 5 | 8 | RuCl$_3$ | 0.5 | white |
| 224 | 5 | 8 | CaCl$_2$ | 0.5 | white |
| 225 | 5 | 8 | Al-isopropylat | 0.5 | white |
| 226 | 5 | 8 | Mn(Ac)$_2$ . 2,5H$_2$O | 10.1 | yellow-brown |
| 227 | 5 | 8 | NiCl$_2$ . 6H$_2$O | 2.2 | green |
| 228 | 5 | 8 | Sr(OH)$_2$ | 3.7 | white |
| 229 | 5 | 8 | Ba(OH)$_2$ | 10.0 | yellow |
| 230 | 5 | 8 | ZnCl$_2$ . 2H$_2$O | 8.8 | yellow |
| 231 | 5 | 8 | Cd(Ac)$_2$ . 2H$_2$O | 14.6 | yellowish |
| 232 | 5 | 8 | Co(Ac)$_2$ . 4H$_2$O | 9.9 | black-brown |
| 233 | 5 | 8 | NiCl$_2$ . 6H$_2$O | 6.7 | yellow-brown |
| 234 | 5 | 8 | CuCl$_2$ . 2H$_2$O | 16.3 | black |
| 235 | 5 | 8 | AgNO$_3$ | 29.5 | yellow-brown |

EXAMPLE 236

A solution of 0.05 mols AgNO$_3$ and 0.05 mols Cd(NO$_3$)$_2$·4H$_2$O in 100 mol. of water was brought to a pH-value of 12.5 by adding ammonia. 3 grams of polydiphenylether-4,4'-dicarboxylic acid-2,4-dihydrazino-6-dimethylamino-s-triazine were stirred in this solution for 6 hours at room temperature. The resulting metallized polymer product was suction filtered, washed with water until the wash water gave a neutral reaction and then dried. The product had a brown color and contained 18% by wt. of silver and 8.0% by weight of cadmium.

EXAMPLE 237

3 grams of polydiphenylether-4,4'-dicarboxylic acid-2,4-dihydrazino-6-dimethylamino-s-triazine were stirred for 3 hours at 65° C. in a solution of 0.025 mols SbCl$_3$ and 0.025 mols SnCl$_2$·2H$_2$O in methanol. The resulting product was filtered off, washed several times with methanol and finally dried. The polymer product was white and contained 9.6% by wt. of antimony and 6.85% by wt. of tin.

The polymers may be wet spun from solution or dry spun, as indicated in our copending application for the non-metallized polymers, and after treated with the indicated metal compounds. The resulting chelated filaments or fibers have satisfactory to good textile properties as a metallized filamentary material, useful not only for its internal coloration caused by the chelated metal but also because of its comparatively heat resistance, flame resistance and other similar properties which can be attributed only to the metal content of the polymer and the fact that the metal is chemically bound to the polymer to form a complex compound.

Although it is especially preferred to combine the metal with a polymer which is in finely divided or dissolved form so as to provide a relatively homogeneous product in the shortest period of time, one can also immerse filaments, films or similar materials in a solution of one or more metal compounds to achieve a take-up of the metal occurring primarily in the outer surface layers unless there is a good swelling action by the solvent. By using the polymer in a swollen state, e.g. by contacting it with a solvent having a swelling action, there is a more complete impregnation or penetration with fibers, films or the like.

In general, the metallized polymer products of the invention, which may have one or a combination of the properties of coloration, flame-proofing or heat resistance, have a wide range of use as pigments, supported catalysts or fillers and particularly as a new source of synthetic textile filaments or fibers.

The invention is hereby claimed as follows:

1. A metal compound of a fiber-forming polyacyl-2,4-dihydrazino-s-triazine polymer consisting essentially of recurring structural units of the formula

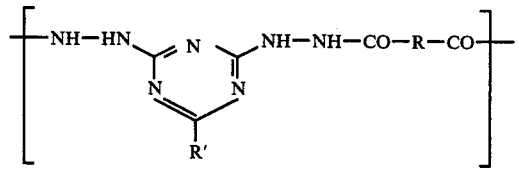

in which:
R is a divalent aromatic radical of 6 to 15 carbon atoms; and
R' is alkyl of 1 to 4 carbon atoms, phenyl, alkoxy of 1 to 4 carbon atoms, phenoxy, dialkylamino of 2 to 8 carbon atoms, piperidyl, morpholyl or phosphonic acid dialkyl ester of 2 to 8 carbon atoms,
said metal being chemically bound in complex form to at least one of the polymer units in an amount of at least 0.1% by weight with reference to said polymer and said metal being at least one member selected from the class consisting of the metals of Groups IIa, IIIa, IVa, Va, VIa, VIIa, VIII, Ib, IIb, IIIb, IVb and Vb of the long periodic system of elements.

2. A metal compound as claimed in claim 1 wherein R in the polymer unit is a divalent radical selected from the group consisting of

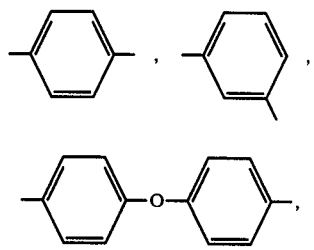

-continued

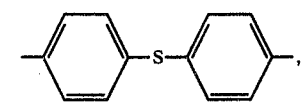

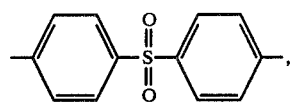

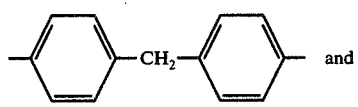 and

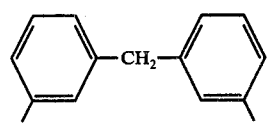

3. A metal compound as claimed in claim 1 wherein the metal is at least one member selected from the group consisting of zinc, tin, cadmium, barium, strontium, antimony and tantalum.

4. A metal compound as claimed in claim 2 wherein the metal is at least one member selected from the group consisting of zinc, tin, cadmium, barium, strontium, antimony and tantalum.

5. A process for the production of a metal-containing and fiber-forming polyacyl-dihydrazino-s-triazine which comprises contacting a polyacyl-dihydrazino-s-triazine polymer consisting essentially of recurring structural units of the formula

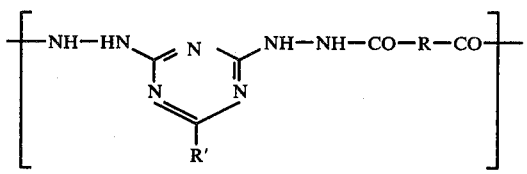

in which:
R is a divalent aromatic radical of 6 to 15 carbon atoms; and
R' is alkyl of 1 to 4 carbon atoms, phenyl, alkoxy of 1 to 4 carbon atoms, phenoxy, dialkylamino of 2 to 8 carbon atoms, piperidyl, morpholyl or phosphonic acid dialkyl ester of 2 to 8 carbon atoms,
said metal being chemically bound in complex form to at least one of the polymer units in an amount of at least 0.1% by weight with reference to said polymer and said metal being at least one member selected from the class consisting of the metals of Groups IIa, IIIa, IVa, Va, VIa, VIIa, VIII, Ib, IIb, IIIb, IVb and Vb of the long periodic system of elements.

6. A process as claimed in claim 5 wherein the liquid solvent for the metal compound is selected from the group consisting of water, methanol, dimethyl formamide, N-methylpyrrolidone and dimethylsulfoxide.

7. A process as claimed in claim 5 wherein the metal compound is selected from the class consisting of solvent-soluble inorganic and organic metal salts.

8. A process as claimed in claim 5 wherein the polyacyldihydrazino-s-triazine is contacted with the solution containing the metal compound at room temperature for a period of time sufficient to combine at least 0.1% by weight of the metal with the polymer.

9. A process as claimed in claim 5 wherein the metal is a member selected from the group consisting of zinc, tin, cadmium, barium, strontium, calcium, antimony and tantalum.

10. A process as claimed in claim 5 wherein the polyacyl-dihydrazino-s-triazine is contacted while in a swollen state with the solvent containing the dissolved metal compound.

* * * * *

UNITED STATES PATENT AND TRADEMARK OFFICE
CERTIFICATE OF CORRECTION

PATENT NO. : 4,104,258
DATED : August 1, 1978
INVENTOR(S) : Del Rio et al

It is certified that error appears in the above-identified patent and that said Letters Patent are hereby corrected as shown below:

Claim 5, after the definition of R', the remaining paragraph of the claim should read ...

--with a liquid solvent containing dissolved therein at least one metal compound soluble in said solvent, in an amount of dissolved metal sufficient to combine at least 0.1% by weight of the metal with said polymer, the metal being selected from the class consisting of the metals of Groups Ia, IIa, IIIa, IVa, Va, VIa, VIIa, VIII, Ib, IIb, IIIb, IVb and Vb of the long periodic system of the elements.--

Change the title from "Metal Complex Compounds of Polyacyl-2,4-Dihydrazino-5-Triazines" to --Metal Complex Compounds of Polyacyl-2,4-Dihydrazino-s-Triazines--.

Signed and Sealed this

Twenty-seventh Day of March 1979

[SEAL]

Attest:

RUTH C. MASON
Attesting Officer

DONALD W. BANNER
Commissioner of Patents and Trademarks